(12) United States Patent
Stoffel et al.

(10) Patent No.: US 6,205,553 B1
(45) Date of Patent: Mar. 20, 2001

(54) METHOD FOR CONTROLLING INDEPENDENT SECURE TRANSACTIONS BY MEANS OF A SINGLE APPARATUS

(75) Inventors: Laurent Stoffel, Issy-les-Moulineaux; David Arditti; Mireille Campana, both of Clamart, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 08/888,367

(22) Filed: Jul. 3, 1997

(30) Foreign Application Priority Data

Jul. 11, 1996 (FR) .................................................. 96 08692

(51) Int. Cl.$^7$ .................................................. G06F 17/60
(52) U.S. Cl. .................................................. 713/202
(58) Field of Search ................... 380/24, 23, 4; 705/41, 64, 65, 66, 67; 713/202, 200

(56) References Cited

U.S. PATENT DOCUMENTS

| | | | |
|---|---|---|---|
| 4,656,342 | 4/1987 | Ugon | 235/379 |
| 4,683,553 | 7/1987 | Mollier | 380/4 |
| 5,128,997 | 7/1992 | Pailles et al. | 380/23 |
| 5,481,612 | * 1/1996 | Campana et al. | 380/25 |
| 5,649,118 | * 7/1997 | Carlisle et al. | 705/41 |
| 5,720,035 | * 2/1998 | Allegre et al. | 395/200.55 |
| 5,774,551 | * 6/1998 | Wu et al. | 380/25 |

FOREIGN PATENT DOCUMENTS

| | | |
|---|---|---|
| 089876 | 9/1983 | (EP) . |
| 114773 | 8/1984 | (EP) . |
| 385290 | 9/1990 | (EP) . |
| 409701 | 1/1991 | (EP) . |
| 671712 | 9/1995 | (EP) . |
| 2616940 | 12/1988 | (FR) . |
| 95/22810 | 8/1995 | (WO) . |

* cited by examiner

*Primary Examiner*—Tod R. Swann
*Assistant Examiner*—Matthew Smithers
(74) *Attorney, Agent, or Firm*—Pearne & Gordon LLP

(57) ABSTRACT

The present invention relates to a procedure for controlling independent secure transactions using a single physical apparatus (11) that is the property of the user, wherein:

the user of said apparatus obtains the apparatus independently of any service provider, on presentation by the user of said apparatus (11) to a service provider ($P_1$, $P_2$, $P_3$) said service provider supplies a set of data identifying the user associated with the apparatus for access to a given service ($S_1$, $S_2$, $S_3$)

the combination of the apparatus and the data enables a secure transaction to be conducted with the service.

5 Claims, 2 Drawing Sheets

METHOD FOR CONTROLLING INDEPENDENT SECURE TRANSACTIONS BY MEANS OF A SINGLE APPARATUS

FIELD OF THE INVENTION

The present invention relates to a method for controlling independent secure transactions by means of a single apparatus.

PRIOR ART

In systems using the known art for handling secure transactions for purposes such as subways, banks, information technology, garages, parking meters, canteens, etc., various devices such as cards, tokens and secret keys are used to identify users before providing them with a billed service. Each type of system normally uses its own apparatus; this may be passive, e.g. punch card or monthly season ticket, or active, e.g. smart card or pocket calculator.

For instance, multi-sector cards such as the Gemplus MCOS card or the Bull TB100 are smart cards comprising several independent registers, each of which behaves like a separate card. A single card may therefore be used for several different applications, the integrity of each application being guaranteed.

Various systems have been devised to provide multi-provider media in which a single apparatus is used by several services (e.g. multi-provider card used to access a range of competing channels in a cable network), or where one service provider uses a device issued by a different provider (e.g. the use of bank cards in payphones). Card manufacturers themselves have produced multi-purpose cards that can be managed by several service providers in which the integrity of each is guaranteed. However, for reasons related to ownership of the cards, few of these attempts have come to anything; for example, banks insist on modification of payphones so that their cards can be used. Others have failed outright. A situation has thus come about in which each person has one card issued by a bank, another by a telephone company, an identity card issued by his or her employer, a card giving access to a parking lot, etc.

The type of apparatus shown in FIG. 1 comprising a main branch 10 and several applications $A_1$, $A_2$, . . . $A_n$, e.g. telephone, bank and health, has never seen the light of day because it has proved impossible to arrive at a consensus on the choice of coordinator to manage the card at the highest level. In FIG. 1 each application has its own code file FC enabling local management of each application independently of the others.

A further problem is that adding an application to a smart card requires a personalization phase, normally a physical operation. It will easily be understood that a user might be reluctant to entrust a banker's card to a service provider for it to undergo this type of modification.

The aim of the present invention is to provide a method in which a single authentication apparatus can be offered to all service providers.

DISCLOSURE OF THE INVENTION

The present invention provides a method for controlling independent secure transactions between a user and one of a plurality of different service providers comprising the steps of:

acquiring a physical device independently of any service provider by the user, said physical device comprises a public key (Kup) and a secret key (Kus) and remains unchanged following the step of acquiring;

presenting of the physical device and associated identifier to said one service provider by the user;

supplying the user with a certified digital profile by the service supplier which comprises access rights to a given service of said one service provider, the identifier which identifies the user to the service provider, and the public key of the physical device; and initiating a secure transaction with said one service provider, by the user providing the certified digital profile to said one service provider and by the user providing authentication by encrypting a random number sent by said one service provider using the secret key of the physical device.

Advantageously the service provider checks that the user is entitled to the apparatus by requesting him/her to sign a random number using the secret key contained in the apparatus.

According to a preferred embodiment disclosed herein the invention method advantageously comprises the following:

said one service provider holds a second public key and a second secret key;

on presentation by the user of the physical device, said one service provider signs or encrypts the profile of the user by means of the second secret key;

on initiation of a secure transaction with said one service provider by the user, said one service provider verifies the digital profile sent by the user by means of the second public key; and on authentication of the user, said one service provider verifies the encrypted random number sent by the user by means of the public key of the user.

In a first application, the method according to the invention comprises the following steps:

the user obtains a smart card bearing a public key. This card bears a public signing algorithm and a combination of a secret key, Kus, and a public key, Kup, the user contacts the service provider supplying the required service. The user identifies him/herself or the service provider itself carries out an identity check.

The user gives the public key Kup and the apparatus by any means that enables the service provider to identify him/her, the service provider supplies the client with a computer file containing the user profile and the signature of this profile (Kp (access rights, identifier, Kup) compiled together with the service provider's secret key Kps; this signature is known as the certificate, the user requests access to the service, sending his/her profile together with the certificate, the service provider checks the certificate using its public key Kpp, thereby obtaining the user's public key Kup. The service provider then launches an active authentication phase:

The service provider sends the client a non-reproducible random number R,

The client signs R and sends back Kus(R),

The service provider uses the user's public key Kup that was supplied in the profile to check that the value Kus(R) is correct, thereby confirming that the user is entitled to Kus.

if all these checks prove correct, the service provider gives the user access to the service.

In a second embodiment the procedure according to the invention is applied to protecting a licensed software, the apparatus being physically connected to the machine in which the software is to be used. The software includes a compulsory initialization phase that requires the potential user to supply his/her profile. On presentation of the apparatus, the software provider gives the user a certified profile file containing his/her rights to the software together with date parameters and an executable version of the software. When the user wishes to use the software, he/she makes a request and the software asks for the user profile; the software then checks the user's access rights and expiry date, carries out an active authentication procedure and runs as programmed.

In contrast with systems that use the prior art, the apparatus according to the invention remains unchanged.

To access n services, the user makes use of a single apparatus and n non-material media such as computer files or paper numbers. The user no longer needs to use or purchase a large number of apparatuses. Moreover, the single apparatus can be chosen from those that offer the most rigorous authentication and therefore excellent security in relation to the services.

DETAILED DESCRIPTION OF THE EMBODIMENTS

The present invention relates to a method for controlling independent secure transactions by means of a single apparatus.

The apparatus may, for example, be a public key smart card, pocket calculator or micro-computer. The apparatus may be marketed independently by any seller.

The apparatus uses a public key incorporating, for example, the RSA algorithm (see reference [1] at end of description). This contains a unique secret key Kus and the matching public key Kup that become the user's pair of keys.

The computer file containing the user profile, i.e. the description of the user's access rights which were in the prior art concealed in the apparatus, identifier id and public key Kup are in the present invention stored on the equipment of the service provider and allocated to the user on presentation of the apparatus.

This profile alone can match the apparatus and the user identifier for a given service. This identifier may therefore vary from one service to another and be selected by the service provider; this identifier may, for example, be the number of a telephone card, bank account or telephone.

The user profile for a given service, i.e. for a given service provider, is certified (signed using the secret key of the service provider) by the service provider who possesses his/her own combination of secret and public keys.

During an access request to the given service, the user sends his/her certified profile to the service provider. The service provider uses its public key to check the certificate and obtains the user's public key. The service provider then checks that the user is entitled to the apparatus by asking him/her, for example, to sign a random number with the secret key contained within the apparatus.

Figure 1:
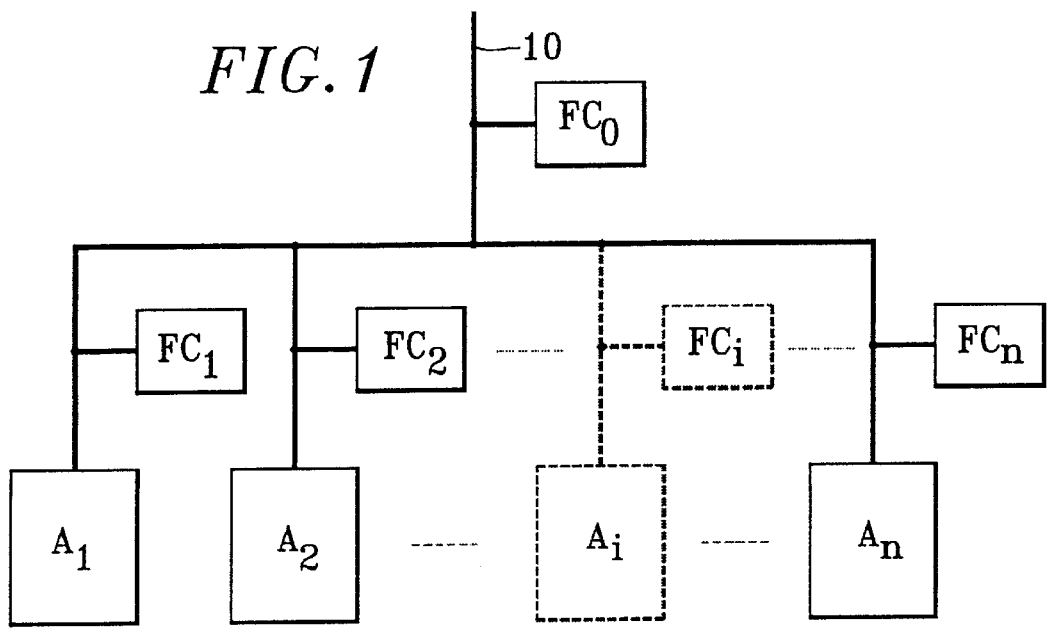
FIG. 1 shows a system according to the known art.
Figure 2:
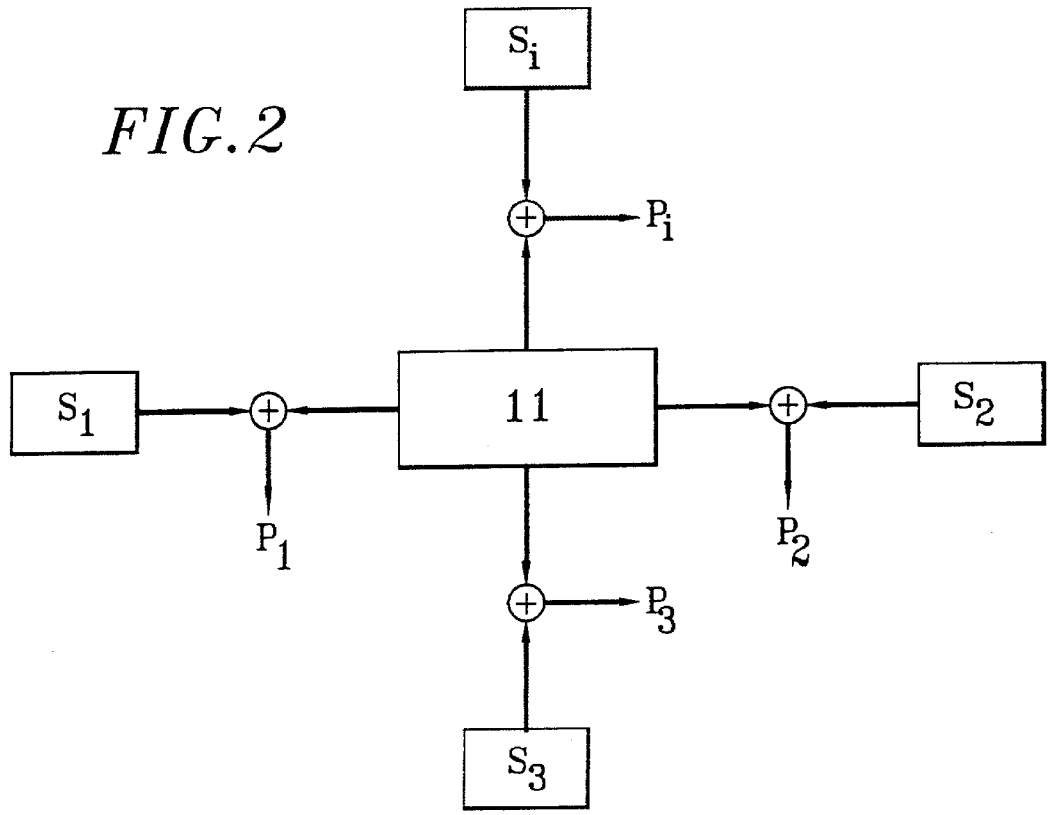
FIG. 2 shows a system for implementing the method according to the invention.

A system for implementing the method according to the invention is illustrated in FIG. 2. This system comprises an unmarked apparatus 11 owned by the user and data from various external service providers $P_1$, $P_2$, $P_3$, $P_i$, etc. These service providers may, for example, include bank, telephone company, health service, etc.

The combination of apparatus+data allows a secure transaction to be effected with the server associated with the data: $S_1$, $S_2$, $S_3$ or $S_i$, etc.

Figure 3:
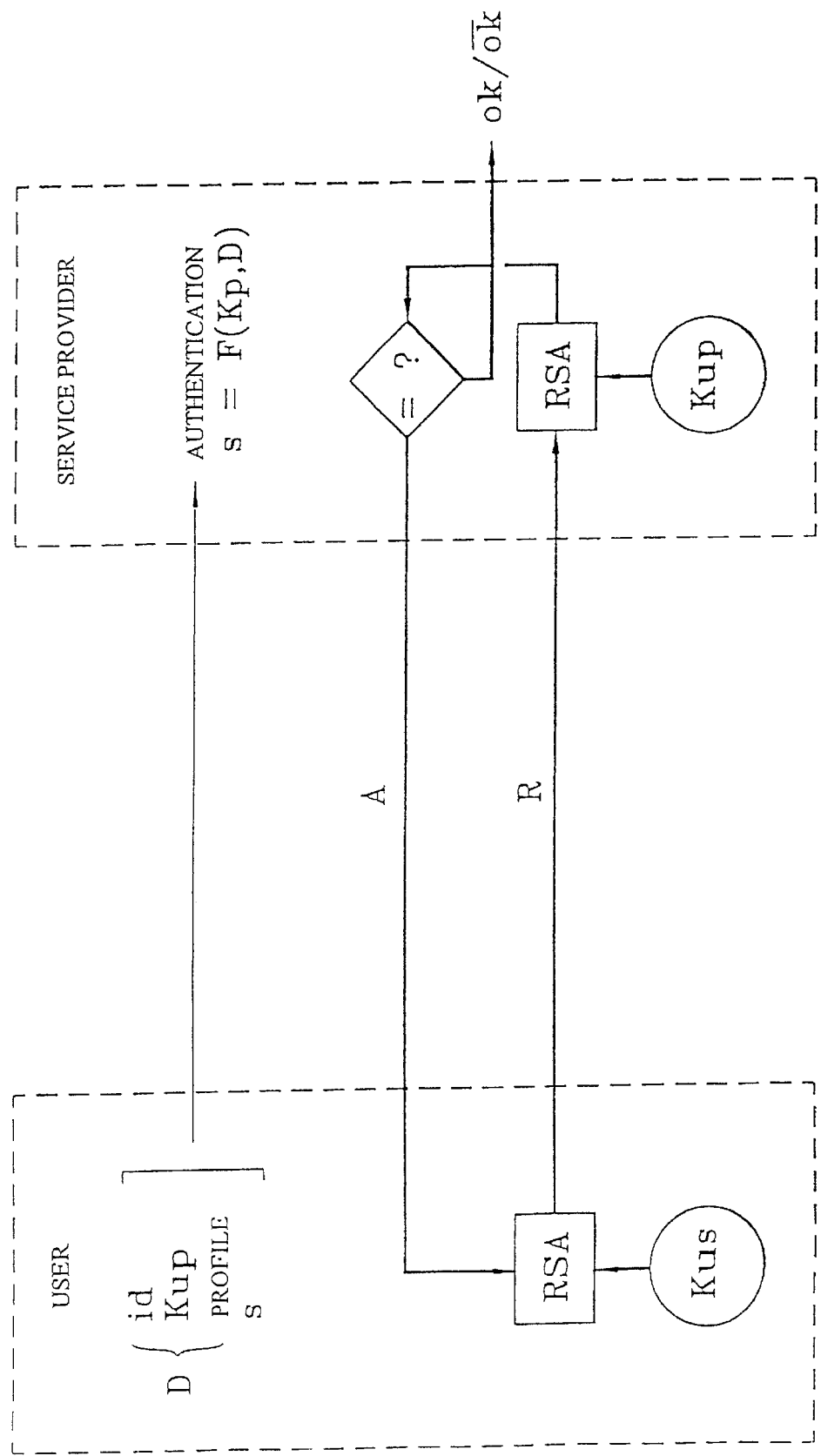
FIG. 3 shows the operation of the method according to the invention.

As can be seen from FIG. 3, during a service access request:

the user sends his/her certified profile to the service provider with:
   data D:
      id: user identifier,
      Kup: public key
      Access Rights
      and a certificate s such as s=F (Kp, D) attributed to the user by the service provider on sign-up; Ks is secret and owned by the service provider, the service provider then checks the certificate s his own data to obtain the profile and compares the profile with the data sent by the user, the service provider sends an authentication request, the user replies using the apparatus, the service provider checks this reply to decide whether or not to allow access to the requested service.

In FIG. 3 this authentication is effected using the RSA algorithm:

The service provider sends a number A.

The apparatus calculates R=RSA(Kus, A), where Kus is the secret key contained within said apparatus.

The service provider calculates RSA(Kup, R) that should be equal to A.

The service provider checks that this is so before granting; or refusing the user access to the service in question if RSA (Kup, R) is different from A.

In contrast with systems using the prior art, in which a user subscribing to a service using an active authentication procedure was supplied with a apparatus by the service provider, e.g. telephone card, Subscriber Identity Module (SIM) for the GSM system, personalized season ticket, etc., recording the user's access rights, the present invention makes it possible to dissociate these access rights physically from the authentication apparatus and place them in a general-purpose medium such as a computer file, number, etc.

In a first application, the procedure according to the invention comprises the following steps:

Purchase of the medium

The user purchases an public-key smart card from the retailer of his/her choice. This card contains a public-key signature algorithm and a combination of a secret key, Kus, and a public key, Kup. The public key Kup can be accessed from the exterior either via a free-read field or physically marked on the card.

Subscribing to a service

The user contacts a service provider that provides the required service. The user indicates his/her identity, or identifier which may also be determined by the service provider, and gives the public key Kup of his/her apparatus. All this information is provided using means that enable the service provider to identify the user. The service provider provides the client with a computer file containing his/her profile and the signature of said profile (Ks(rights, identifier, Kup)) compiled with the service provider's secret key. This signature is known as the certificate.

Accessing the service

The user requests access to the service, sending his/her profile with the certificate. The service provider checks the certificate using its public key Kp thereby verifying the user's public key Kup. It then launches an active authentication phase:

- The service provider sends the client a non-reproducible number R,
- The client signs R and sends back Kus(R),
- The service provider uses the user's public key Kup that was supplied in the profile to check that the value Kus(R) is correct, thereby confirming that the user is in possession of Kus.

If all these checks prove correct, the service provider gives the user access to the service.

In a second application the method according to the invention is applied to the protection of a licensed software. A dongle-type apparatus or card reader is physically connected to the machine in such way as the software can verify the presence of the apparatus.

In this application, the seller is interested in selling licenses to software it owns. The software includes a compulsory initialization phase that requires the potential user to supply his/her profile.

As in the first application, the user only requires a single apparatus.

On presentation of the apparatus, the software provider gives the user a certified profile file containing his/her access rights to the software together with date parameters and an executable version of the software.

When the user wishes to use the software, he/she makes a request and the software asks for the user profile; the software then checks the user's rights and expiry date, carries out an active authentication procedure and runs as programmed.

If the software is fraudulently copied the fraudster may copy the profile file but needs access to the authentication apparatus to go beyond the active authentication phase which is different at each stage. The software will therefore only run in a single place at any one time.

What is claimed is:

1. A method for controlling independent secure transactions between a user and one of a plurality of different service providers comprising the steps of:

the user acquiring a physical device independently of any service provider by the user, said physical device comprises a public key (Kup) and a secret key (Kus) and remains unchanged following the step of acquiring;

the user presenting of the physical device and associated identifier to said one service provider;

the service provider supplying the user with a certified digital profile by the service supplier which comprises access rights to a given service of said one service provider, the identifier which identifies the user to the service provider, and the public key of the physical device; and initiating a secure transaction with said one service provider, by the user providing the certified digital profile to said one service provider and by the user providing authentication by encrypting a random number sent by said one service provider using the secret key of the physical device.

2. The method of claim 1 applied to the protection of a licensed software wherein the physical device is physically connected to a machine in which the software is to be used and wherein the software includes a compulsory initialization phase that requires the potential user to supply his/her profile, on presentation of the physical device, the software provider gives the user a certified profile file containing his/her access rights to the software together with date parameters and an executable version of the software; when the user wishes to use the software, he/she makes a request and the software asks for the user profile; the software then checks the user's access rights and expiry date, carries out an active authentication procedure and runs as programmed.

3. The method of claim 1, wherein:

said one service provider holds a second public key and a second secret key;

on presentation by the user of the physical device, said one service provider signs or encrypts the profile of the user by means of the second secret key;

on initiation of a secure transaction with said one service provider by the user, said one service provider verifies the digital profile sent by the user by means of the second public key; and on authentication of the user, said one service provider verifies the encrypted random number sent by the user by means of the public key of the user.

4. The method of claim 1, wherein the physical device is a smart card comprising a public key, a secret key and signature algorithm with a public signature key.

5. The method of claim 3, wherein the physical device is a smart card comprising a public key, a secret key and signature algorithm with a public signature key.

* * * * *